US012566273B2

(12) United States Patent
Lu et al.

(10) Patent No.: US 12,566,273 B2
(45) Date of Patent: Mar. 3, 2026

(54) TIME-OF-FLIGHT 3D SENSING SYSTEM

(71) Applicant: Himax Technologies Limited, Tainan City (TW)

(72) Inventors: Hsueh-Tsung Lu, Tainan City (TW); Ching-Wen Wang, Tainan City (TW); Cheng-Che Tsai, Tainan City (TW); Wu-Feng Chen, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 712 days.

(21) Appl. No.: 18/098,570

(22) Filed: Jan. 18, 2023

(65) Prior Publication Data

US 2024/0241259 A1 Jul. 18, 2024

(51) Int. Cl.
*G01S 17/894* (2020.01)
*G01S 7/481* (2006.01)
*G01S 7/4915* (2020.01)

(52) U.S. Cl.
CPC .......... *G01S 17/894* (2020.01); *G01S 7/4814* (2013.01); *G01S 7/4915* (2013.01)

(58) Field of Classification Search
CPC .... G01S 7/4865; G01S 7/4863; G01S 7/4914; G01S 7/483; G01S 7/484; G01S 7/486; G01S 17/894; G01S 17/89; G01S 7/4915; G01S 17/36; G01S 7/4814; G01S 17/10; G01S 7/4911; G01S 7/4861; G01S 7/4868; G01B 11/22; G06T 7/50; G06T 7/521; G06T 2207/10028; H04N 23/56; H04N 23/671; H01S 5/0428
USPC .................................. 356/5.01, 5.1; 382/106
See application file for complete search history.

(56) References Cited

U.S. PATENT DOCUMENTS

| | | | | |
|---|---|---|---|---|
| 12,228,684 B2 * | 2/2025 | Jo | ........................... | G01S 17/46 |
| 2011/0317878 A1 * | 12/2011 | Kang | ...................... | G01S 17/10 |
| | | | | 382/106 |
| 2021/0173086 A1 * | 6/2021 | Park | ....................... | G01S 17/10 |
| 2021/0405193 A1 * | 12/2021 | Yang | ..................... | G01S 7/4863 |
| 2022/0252727 A1 * | 8/2022 | Yasu | ..................... | G01S 7/4865 |

* cited by examiner

*Primary Examiner* — Nathnael Aynalem
(74) *Attorney, Agent, or Firm* — Donald E. Stout; Stout, Uxa & Buyan, LLP

(57) ABSTRACT

A time-of-flight (ToF) three-dimensional (3D) sensing system includes a projector that generates an emitted light corresponding to an emitted signal; a sensor that generates a received signal according to a reflected light; and a decoder that determines a distance between the sensor and the object according to the received signal. The emitted signal associated with the emitted light is generated in a basis period, and the received signal associated with the reflected light is generated by the sensor with a first phase shift with respect to a beginning of the basis period. No emitted light is generated in a supplemental period following the basis period, and the received signal has a second phase shift with respect to a beginning of the supplemental period. The distance between the sensor and the object is determined according to the first phase shift and the second phase shift.

20 Claims, 4 Drawing Sheets

<u>100</u>

100

100

100

100

100

TIME-OF-FLIGHT 3D SENSING SYSTEM

BACKGROUND OF THE INVENTION

1. Field of the Invention

The present invention generally relates to light detection and ranging, and more particularly to a time-of-flight (ToF) three-dimensional (3D) sensing system.

2. Description of Related Art

A time-of-flight (ToF) sensor is a range sensing system for measuring a distance between the sensor (e.g., camera) and the object to be determined based on time-of-flight technique by measuring the round trip time of an artificial light signal provided by a light source.

Direct ToF (dToF) is one type of ToF that measures the direct time-of-flight required for a single laser pulse to leave and reflect back the camera. The dToF sensing systems allow rapid acquisition and rapid real-time processing of scene information, however with reduced number of pixels. Indirect ToF (iToF) is another type of ToF that adopts modulated light signals of high frequency with phase detection. Nevertheless, iToF is liable to ambiguity or aliasing as phase shift beyond the period of an emitted signal cannot be definitely determined or differentiated.

Conventional iToF sensing systems adopt two or more modulated light signals with different frequencies to achieve de-aliasing. However, the conventional iToF sensing systems are liable to flare effect with reduced accuracy.

A need has thus arisen to propose a novel ToF sensing system capable of determining a phase shift beyond the period of an emitted signal without suffering flare effect.

SUMMARY OF THE INVENTION

In view of the foregoing, it is an object of the embodiment of the present invention to provide a time-of-flight (ToF) three-dimensional (3D) sensing system with high accuracy and large working range without suffering flare effect.

According to one embodiment, a time-of-flight (ToF) three-dimensional (3D) sensing system includes a projector, a sensor and a decoder. The projector generates an emitted light corresponding to an emitted signal, and the emitted light is projected on an object, thereby resulting in a reflected light. The sensor generates a received signal according to the reflected light. The decoder determines a distance between the sensor and the object according to the received signal. The emitted signal associated with the emitted light is generated in a basis period with a time interval being equal to a period of the emitted signal, and the received signal associated with the reflected light is generated by the sensor with a first phase shift with respect to a beginning of the basis period. No emitted light is generated in a supplemental period, as defined by a flag signal, following the basis period with a time interval being equal to the period of the emitted signal, a pseudo-emitted signal resembling the emitted signal of the basis period is defined in the supplemental period, and the received signal has a second phase shift with respect to a beginning of the supplemental period. The distance between the sensor and the object is determined according to the first phase shift and the second phase shift.

DETAILED DESCRIPTION OF THE INVENTION

Figure 1:
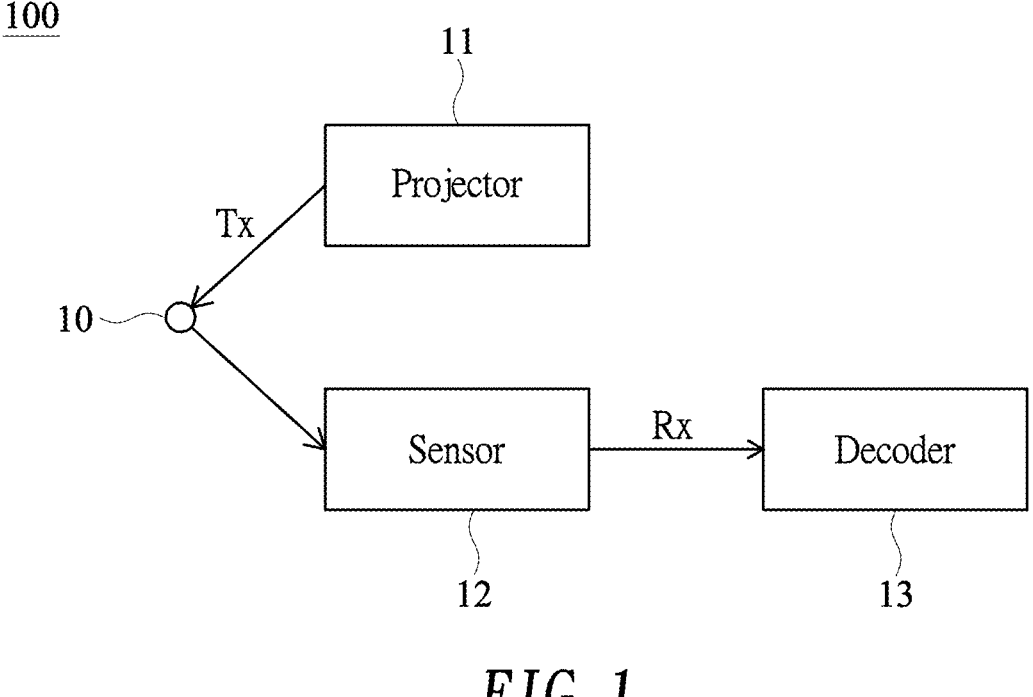
FIG. 1 shows a block diagram illustrating a time-of-flight (ToF) three-dimensional (3D) sensing system, particularly adopting indirect ToF (iToF) technique, according to one embodiment of the present invention.

FIG. 1 shows a block diagram illustrating a time-of-flight (ToF) three-dimensional (3D) sensing system 100, particularly adopting indirect ToF (iToF) technique, according to one embodiment of the present invention.

In the embodiment, the ToF 3D sensing system ("sensing system" hereinafter) 100 may include a projector 11 configured to generate an emitted light corresponding to an emitted signal Tx. The emitted light is then projected on an object 10, thereby resulting in a reflected light. In one embodiment, the projector 11 may include a light-emitting diode (LED). In another embodiment, the projector 11 may include a laser diode (LD), such as an edge-emitting laser (EEL) with laser beam emission from surfaces formed by cleaving an individual chip out of a wafer, or a vertical-cavity surface-emitting laser (VCSEL) with laser beam emission perpendicular from a top surface.

The sensing system 100 of the embodiment may include a sensor 12 configured to generate a received signal Rx according to the reflected light. The sensing system 100 may include a decoder 13 configured to determine a distance between the sensor 12 and the object 10 according to the received signal Rx.

Figure 2A:
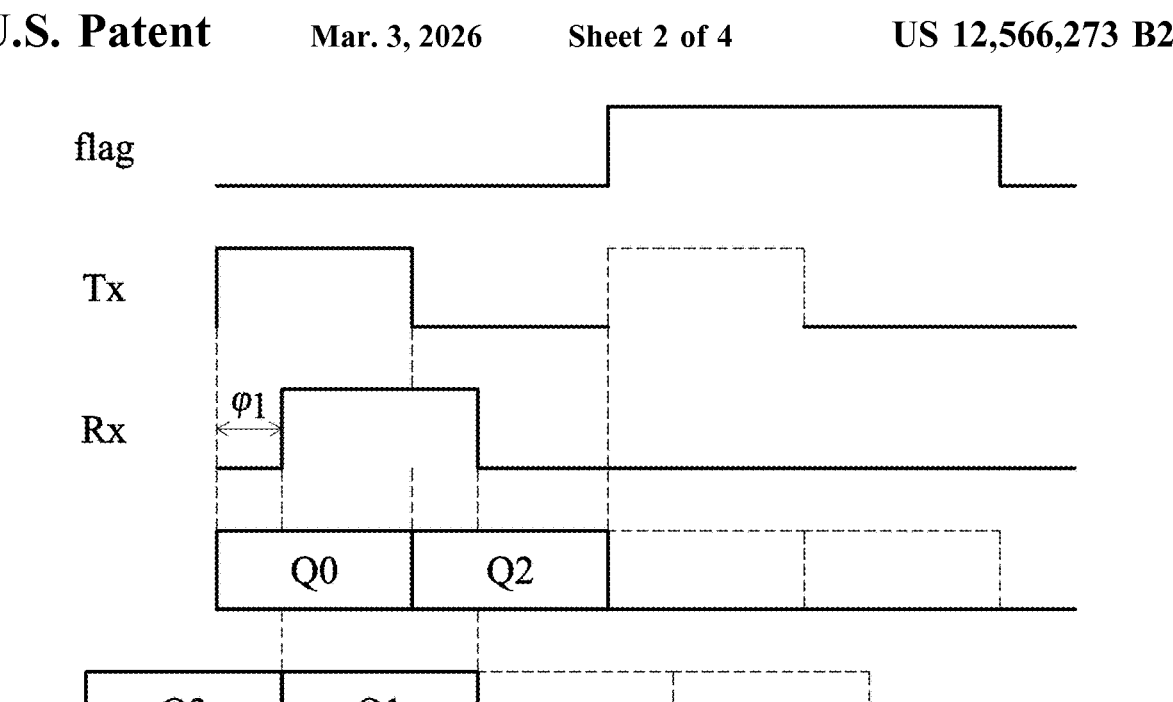
FIG. 2A shows a timing diagram illustrating pertinent signals of the ToF 3D sensing system of FIG. 1.

FIG. 2A shows a timing diagram illustrating pertinent signals of the ToF 3D sensing system 100 of FIG. 1. Specifically, in a first period called basis period (or unambiguous period) with a time interval being equal to a period of the emitted signal Tx, an emitted signal Tx associated with the emitted light is generated (and provided to the projector 11), and a received signal Rx associated with the reflected light is generated (by the sensor 12) with a first phase shift (or phase delay) $\varphi 1$ with respect to a beginning of the basis period. A distance D between the sensor 12 and the object 10 may be determined according to the first phase shift $\varphi 1$.

Specifically, as shown in FIG. 2A, Q0 represents an accumulated charge when a light (i.e., the emitted light) is emitted (by the projector 11), Q2 represents an accumulated charge when the light is not emitted, Q1 represents an accumulated charge when the light is received (by the sensor 12), and Q3 represents an accumulated charge when the light is not received. Accordingly, the first phase shift $\varphi 1$ may be determined as arctangent of a ratio of received (signal) charge difference to emitted (signal) charge difference (in the basis period) as follows:

$$\varphi 1 = \arctan\left(\frac{Q1 - Q3}{Q0 - Q2}\right).$$

As the first phase shift φ1 is obtained, the distance D between the sensor 12 and the object 10 may be determined as:

$$D = \frac{\varphi 1}{4\pi f} C.$$

Figure 2B:
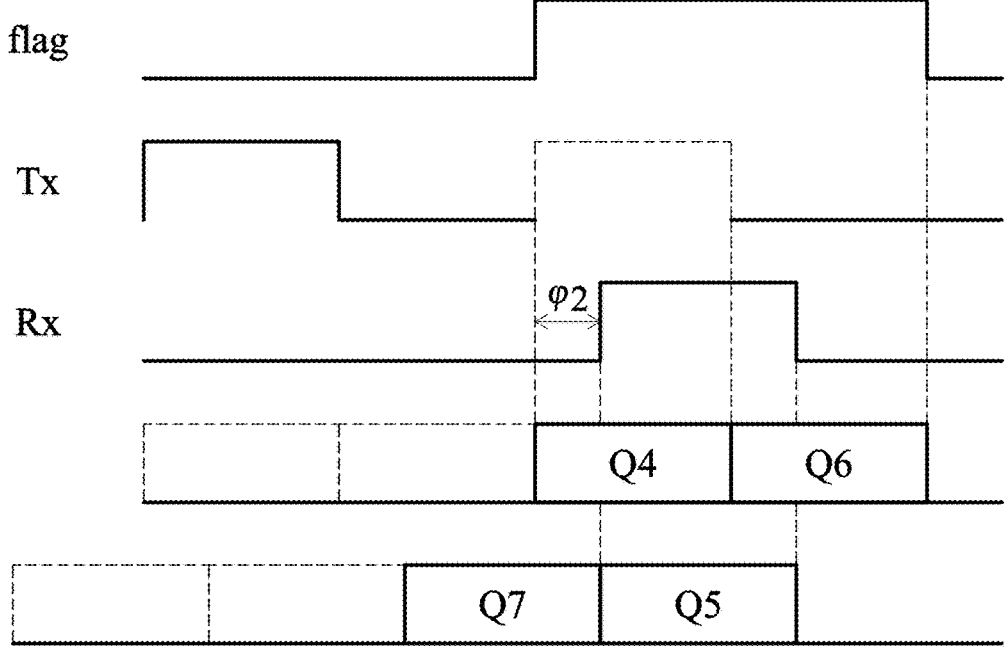
FIG. 2B shows a timing diagram illustrating pertinent signals of the ToF 3D sensing system of FIG. 1 when the object to be determined is beyond a maximum distance resolvable by only the basis period.

FIG. 2B shows a timing diagram illustrating pertinent signals of the ToF 3D sensing system 100 of FIG. 1 when the object 10 to be determined is beyond a maximum distance (Dmax=C/2f, C represents a speed of light and f represents a frequency of the emitted signal Tx) resolvable by only the basis period. Specifically, in a second period, called (first) supplemental period (or ambiguous period) following the basis period, with a time interval being equal to the period of the emitted signal Tx, as defined by a flag signal, a received signal Rx associated with the reflected light is generated (by the sensor 12) with a second phase shift (or delay) φ2 with respect to a beginning of the (first) supplemental period: A distance D between the sensor 12 and the object 10 may be determined according to the second phase shift φ2.

It is noted that no emitted light is generated in the supplemental period, and a pseudo-emitted signal resembling the emitted signal Tx (in the basis period) is defined as denoted by the dashed line. As shown in FIG. 2B, Q4 represents an accumulated charge when the pseudo-emitted signal is active, Q6 represents an accumulated charge when the pseudo-emitted signal is inactive, Q5 represents an accumulated charge when the light is received, and Q7 represents an accumulated charge when the light is not received. Accordingly, the second phase shift φ2 may be determined as arctangent of a ratio of received (signal) charge difference to pseudo-emitted (signal) charge difference (in the first supplemental period) as follows:

$$\varphi 2 = \arctan\left(\frac{Q5 - Q7}{Q4 - Q6}\right).$$

As the second phase shift φ2 is obtained, the distance D between the sensor 12 and the object 10 may be determined as:

$$D = \frac{\varphi 2}{4\pi f} C.$$

According to one aspect of the embodiment, likelihood of the received signal Rx being located in the basis period (indicating that the object 10 is within the maximum distance resolvable by only the basis period), or being located in the supplemental period (indicating that the object 10 is beyond the maximum distance) can be determined (or differentiated) according to a probability value, called confidence parameter, according to corresponding received (signal) charge difference and emitted (signal) charge difference (in corresponding basis or supplemental period). In the embodiment, the confidence parameter Confidence_φ1 associated with the basis period and the confidence parameter Confidence_φ2 associated with the (first) supplemental period may be expressed as follows:

$$\text{Confidence\_}\varphi 1 = \frac{\sqrt{(Q1 - Q3)^2 + (Q0 - Q2)^2}}{2}$$
$$\text{Confidence\_}\varphi 2 = \frac{\sqrt{(Q5 - Q7)^2 + (Q4 - Q6)^2}}{2}.$$

If the confidence parameter Confidence_φ2 associated with the (first) supplemental period is greater than the confidence parameter Confidence_φ1 associated with the basis period, and is higher than a predetermined threshold, the distance D between the sensor 12 and the object 10 is:

$$D = \frac{\varphi 2}{4\pi f} C + D\text{max}.$$

Otherwise, the distance D between the sensor 12 and the object 10 is:

$$D = \frac{\varphi 1}{4\pi f} C.$$

Generally speaking, the amount of the supplemental periods may be greater than one, and the distance D between the sensor 12 and the object 10 may be expressed as follows:

$$D = \frac{\varphi}{4\pi f} C + T * D\text{max}$$

where if a confidence parameter associated with a supplemental period is determined as having a greatest value and is higher than a predetermined threshold, φ represents a phase shift associated with said determined supplemental period (with the greatest confidence parameter), T represents an amount of supplemental periods before and including said determined supplemental period; otherwise T is set zero and φ represents a phase shift associated with the basis period.

The confidence parameters as discussed above may be adaptable to multipath interference, a phenomenon that results in optical signals reaching the sensor 12 by two or more paths and causes flare effect. In one exemplary scenario with multipath interference, for example, caused by near-distance object, confidence parameters associated with near-distance supplemental periods may be neglected while determining a confidence parameter with a greatest value, and the formula for the distance D between the sensor 12 and the object 10 as discussed above may apply as well.

In an alternative embodiment, a plurality of distances D may be obtained and a weighted sum is then obtained, where smaller weights are used for distances D associated with smaller confidence parameters.

Figures 3A, 3B:
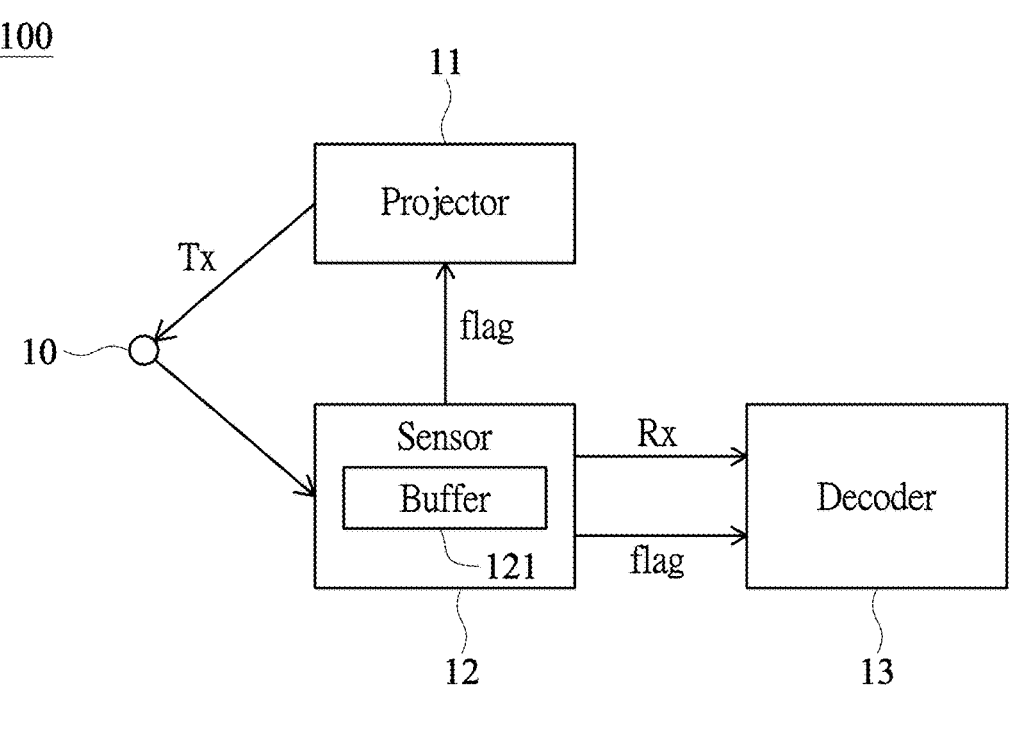
FIG. 3A to FIG. 3D show block diagrams illustrating arrangements for the flag signal used to define the supplemental periods in a ToF 3D sensing system according to some embodiments of the present invention.

FIG. 3A to FIG. 3D show block diagrams illustrating arrangements for the flag signal used to define the supplemental periods in a ToF 3D sensing system 100 according to some embodiments of the present invention. Specifically, in the embodiment as illustrated in FIG. 3A, the sensor 12 acts as a host to send the flag signal to the projector 11 and the decoder 13. Moreover, the sensor 12 may include a buffer 121 configured to temporarily store the received signal Rx.

In the embodiment as illustrated in FIG. 3B, the decoder 13 acts as a host to send the flag signal to the sensor 12, which sends a synchronization signal (sync) to the projector 11. Moreover, the decoder 13 may include a buffer 131 configured to temporarily store the received signal Rx.

Figure 3C:
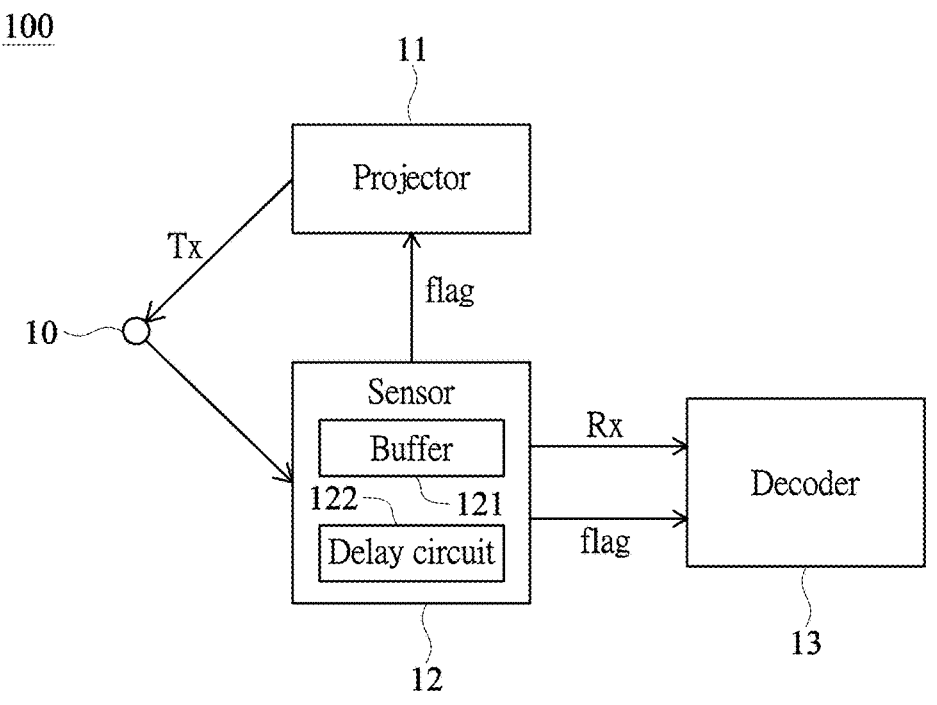

In the embodiment as illustrated in FIG. 3C, which is similar to FIG. 3A, the sensor 12 may include a delay circuit 122 configured to generate delay signals for coordinating the sensor 12 and the projector 11. Similarly, the sensor 12 may include a buffer 121 configured to temporarily store the received signal Rx.

Figure 3D:
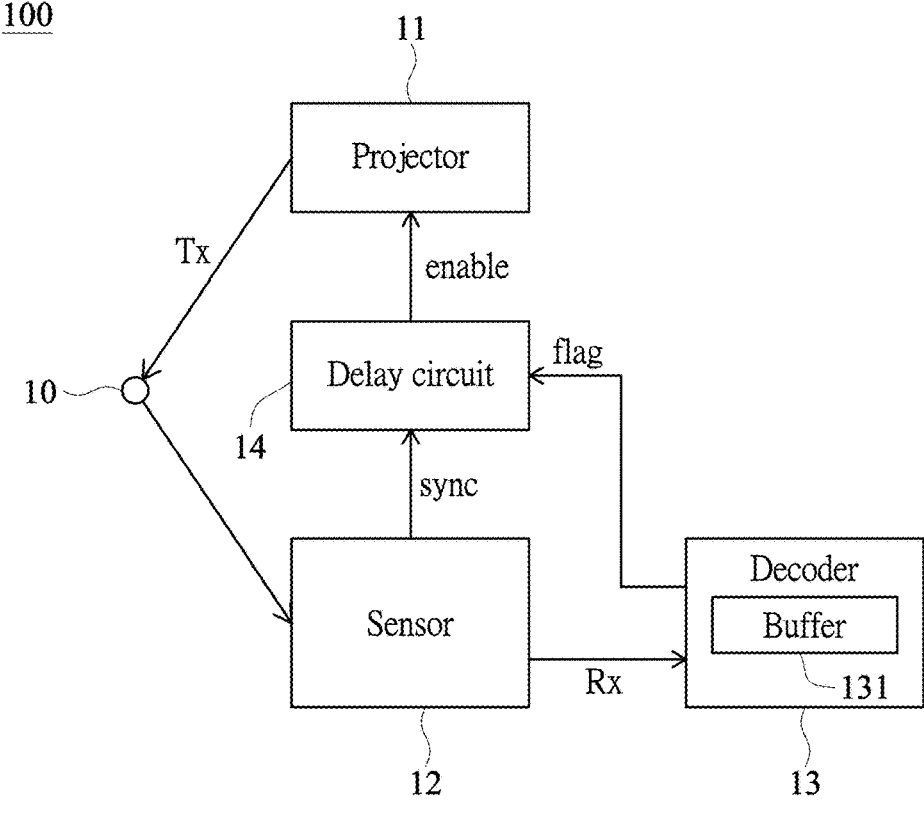

In the embodiment as illustrated in FIG. 3D, which is similar to FIG. 3B, the sensing system 100 may include a delay circuit 14, external to the sensor 12, configured to generate delay signals for coordinating the sensor 12 and the projector 11. The decoder 13 acts as a host to send the flag signal to the delay circuit 14, the sensor 12 sends a synchronization signal (sync) to the delay circuit 14, and the delay circuit 14 accordingly sends an enable signal to the projector 11.

Although specific embodiments have been illustrated and described, it will be appreciated by those skilled in the art that various modifications may be made without departing from the scope of the present invention, which is intended to be limited solely by the appended claims.

What is claimed is:

1. A time-of-flight (ToF) three-dimensional (3D) sensing system, comprising:
   a projector that generates an emitted light corresponding to an emitted signal, the emitted light being projected on an object, thereby resulting in a reflected light;
   a sensor that generates a received signal according to the reflected light; and
   a decoder that determines a distance between the sensor and the object according to the received signal;
   wherein the emitted signal associated with the emitted light is generated in a basis period with a time interval being equal to a period of the emitted signal, and the received signal associated with the reflected light is generated by the sensor with a first phase shift with respect to a beginning of the basis period;
   no emitted light is generated in a supplemental period, as defined by a flag signal, following the basis period with a time interval being equal to the period of the emitted signal, a pseudo-emitted signal resembling the emitted signal of the basis period is defined in the supplemental period, and the received signal has a second phase shift with respect to a beginning of the supplemental period; and
   the distance between the sensor and the object is determined according to the first phase shift and the second phase shift.

2. The system of claim 1, wherein the projector comprises a light-emitting diode or a laser diode.

3. The system of claim 1, wherein the first phase shift $\varphi1$ is determined as arctangent of a ratio of received charge difference to emitted charge difference in the basis period as follows:

$$\varphi1 = \arctan\left(\frac{Q1 - Q3}{Q0 - Q2}\right)$$

where Q0 represents an accumulated charge when a light is emitted, Q2 represents an accumulated charge when the light is not emitted, Q1 represents an accumulated charge when the light is received, and Q3 represents an accumulated charge when the light is not received.

4. The system of claim 3, wherein the distance D between the sensor and the object is determined as follows:

$$D = \frac{\varphi1}{4\pi f}C$$

where C represents a speed of light and f represents a frequency of the emitted signal.

5. The system of claim 1, wherein the second phase shift is determined as arctangent of a ratio of received charge difference to pseudo-emitted charge difference in the first supplemental period as follows:

$$\varphi2 = \arctan\left(\frac{Q5 - Q7}{Q4 - Q6}\right)$$

where Q4 represents an accumulated charge when the pseudo-emitted signal is active, Q6 represents an accumulated charge when the pseudo-emitted signal is inactive, Q5 represents an accumulated charge when the light is received, and Q7 represents an accumulated charge when the light is not received.

6. The system of claim 5, wherein the distance D between the sensor and the object is determined as follows:

$$D = \frac{\varphi2}{4\pi f}C$$

where C represents a speed of light and f represents a frequency of the emitted signal.

7. The system of claim 1, wherein likelihood of the received signal being located in the basis period or being located in the supplemental period is determined according to a confidence parameter in the corresponding basis or supplemental period.

8. The system of claim 7, wherein the confidence parameter Confidence_$\varphi1$ associated with the basis period and the confidence parameter Confidence_$\varphi2$ associated with the supplemental period is expressed as follows:

$$\text{Confidence\_}\varphi1 = \frac{\sqrt{(Q1 - Q3)^2 + (Q0 - Q2)^2}}{2}$$

$$\text{Confidence\_}\varphi2 = \frac{\sqrt{(Q5 - Q7)^2 + (Q4 - Q6)^2}}{2}$$

where Q0 represents an accumulated charge when a light is emitted, Q2 represents an accumulated charge when the light is not emitted, Q1 represents an accumulated charge when the light is received, Q3 represents an accumulated charge when the light is not received, Q4 represents an accumulated charge when the pseudo-emitted signal is active, Q6 represents an accumulated charge when the pseudo-emitted signal is inactive, Q5 represents an accumulated charge when the light is received, and Q7 represents an accumulated charge when the light is not received.

9. The system of claim 8, wherein if the confidence parameter Confidence_$\varphi2$ associated with the supplemental period is greater than the confidence parameter Confidence_$\varphi1$ associated with the basis period, and is higher than a predetermined threshold, the distance D between the sensor and the object is determined as follows:

$$D = \frac{\varphi 2}{4\pi f} C + D\text{max}.$$

otherwise, the distance D between the sensor and the object is determined as follows:

$$D = \frac{\varphi 1}{4\pi f} C$$

where $\varphi 1$ represents the first phase shift, $\varphi 2$ represents the second phase shift, C represents a speed of light, f represents a frequency of the emitted signal, Dmax represents a maximum distance resolvable by only the basis period and is equal to C/2f.

10. The system of claim 9, wherein amount of the supplemental period is greater than one, and the distance between the sensor and the object is determined as follows:

$$D = \frac{\varphi}{4\pi f} C + T * D\text{max}$$

where if a confidence parameter associated with a supplemental period is determined as having a greatest value and is higher than a predetermined threshold, $\varphi$ represents a phase shift associated with said determined supplemental period, T represents an amount of supplemental periods before and including said determined supplemental period; otherwise T is set zero and $\varphi$ represents a phase shift associated with the basis period.

11. The system of claim 10, wherein a confidence parameter associated with an object that causes multipath interference is neglected while determining the confidence parameter with the greatest value.

12. The system of claim 9, wherein amount of the supplemental period is greater than one, a plurality of distances between the sensor and the object corresponding to the basis period and the supplemental periods respectively are determined, and a weighted sum thereof is obtained.

13. The system of claim 1, wherein the sensor acts as a host to send the flag signal to the projector and the decoder.

14. The system of claim 13, wherein the sensor comprises a buffer to temporarily store the received signal.

15. The system of claim 1, wherein the decoder acts as a host to send the flag signal to the sensor, which sends a synchronization signal to the projector.

16. The system of claim 15, wherein the decoder comprises a buffer to temporarily store the received signal.

17. The system of claim 13, wherein the sensor comprises a delay circuit to generate delay signals for coordinating the sensor and the projector.

18. The system of claim 17, wherein the sensor comprises a buffer to temporarily store the received signal.

19. The system of claim 1, further comprising a delay circuit to generate delay signals for coordinating the sensor and the projector.

20. The system of claim 19, wherein the decoder acts as a host to send the flag signal to the delay circuit, the sensor sends a synchronization signal to the delay circuit, and the delay circuit accordingly sends an enable signal to the projector.

\* \* \* \* \*